UNITED STATES PATENT OFFICE.

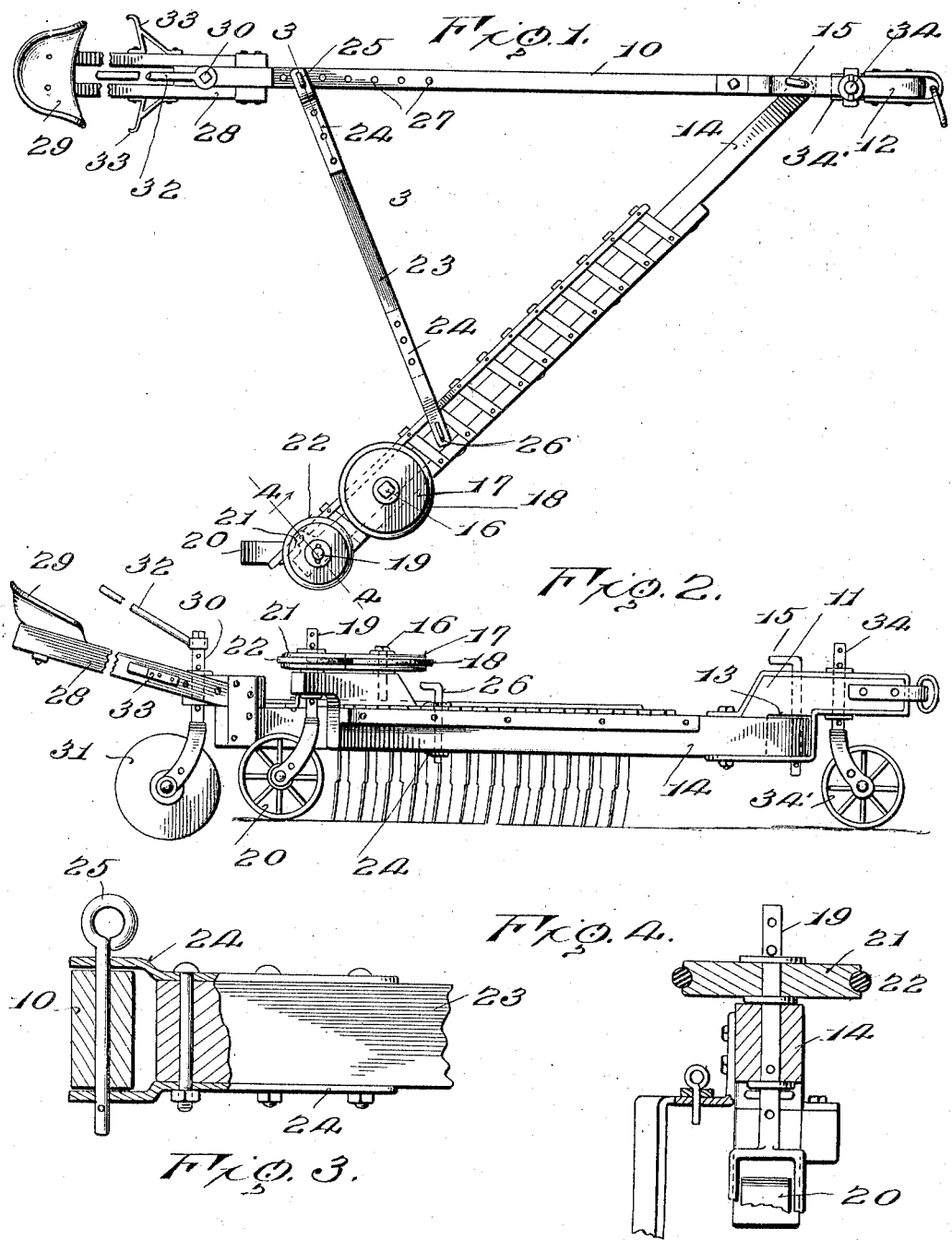

FRANK F. PRATT, FRANK H. FARMER, AND JAMES KEMP, OF WHITTIER, CALIFORNIA.

ORCHARD-CULTIVATOR.

1,316,183. Specification of Letters Patent. Patented Sept. 16, 1919.

Application filed December 5, 1918. Serial No. 265,418.

*To all whom it may concern:*

Be it known that we, FRANK F. PRATT, FRANK H. FARMER, and JAMES KEMP, citizens of the United States, residing at Whittier, in the county of Los Angeles, State of California, have invented certain new and useful Improvements in Orchard-Cultivators; and we do hereby declare the following to be a full, clear, and exact description of the invention, such as will enable others skilled in the art to which it appertains to make and use the same.

This invention relates to agricultural machines and particularly to orchard cultivators for cultivating around citrous bearing fruit trees.

One object of the present invention is to provide a device of this character which includes novel and improved means for protecting the trees from damage by the cultivator.

Another object is to provide a device of this character which includes novel and improved means whereby cultivation of the soil to a point within a few inches of the tree trunks is assured, and without injury to the trunks or low hanging branches of the trees.

A further object of the invention is to provide a cultivator which is easy to operate, simple in construction, and which can be readily adjusted to the width desired.

Other objects and advantages will be apparent from the following description when taken in connection with the accompanying drawing.

In the drawing:

Figure 1 is a top plan view of a cultivator made in accordance with our invention.

Fig. 2 is a side elevation of the same.

Fig. 3 is an enlarged vertical transverse sectional view taken on the line 3—3 of Fig. 1, showing the manner of connecting one of the beams to the draft beam.

Fig. 4 is an enlarged vertical transverse sectional view taken on the line 4—4 of Fig. 1.

Referring particularly to the accompanying drawing, 10 represents the draft beam of the cultivator, the forward end of which is offset upwardly and forwardly as shown at 11. A metal strap 12 is secured to this end of the beam and extends vertically on the forward end face and rearwardly on the upper face, while the lower portion of the strap extends horizontally rearward and is secured to the lower face of the main body of the beam. There is thus formed a socket 13, bounded by the strap and the offset portion of the beam, and into this socket is disposed one end of the cultivator beam 14, said beam, and the offset portion 11, as well as the strap 12, are formed with vertically alining openings for the reception of the connecting pin 15. Suitable ground treating members, such as spring teeth, cultivator shovels, or the like, are detachably secured to this beam. Disposed vertically through the other end of the beam 14 is a shaft 16, and rotatably mounted on the shaft, above the beam, is a buffer wheel 17, having a rubber tread 18 to prevent damage to the trunks of the trees when coming in contact therewith. In the end of the beam 14, outwardly of the shaft 16, is rotatably disposed the vertical pintle 19 of the caster 20. Rotatably mounted on the upper end of this pintle, which extends above the beam, is a second smaller buffer wheel 21, also having a rubber tread 22. This wheel 21, however, rotates independently of the caster pintle, and is not rigidly connected therewith.

It is necessary to adjust the beam 14 with relation to the draft beam 10, and to this end we have provided the spacing and holding beam 23. This beam extends between the rear end portions of the beams 14 and 10, and has the apertured straps 24 secured to the upper and lower faces of its opposite ends, said straps straddling the beams, as clearly shown in the drawing. Removable pins 25 and 26 are disposed in the straps and the beams to hold them in proper position with respect to each other. The beam 10 is provided with a plurality of openings 27 for the interchangeable reception of the pin 25 whereby the beam 23 is adapted to be adjusted longitudinally on the beam 10, and thus vary the angle of the beam 14.

Secured to the rear end of the beam 10, and extending upwardly and rearwardly therefrom, is a short beam 28, and secured on the outer end of this short beam is the operator's seat 29. Rotatably disposed vertically through the beam 10, at the point of juncture of the said beam and the beam 28, is the pintle 30 of the caster wheel 31, said wheel being in the form of a rotatable metal disk which is arranged to cut into the soil and serve as a rudder whereby the machine is guided in its forward course. A handle bar 32 is mounted on the upper end of the pintle 30 which is disposed in position to be held and operated by the driver from his seat.

A pair of laterally extending foot-rests 33 are secured to the sides of the rear end of the beam 10, on which the driver places his feet.

There is thus provided a novel and efficient device whereby the soil of an orchard can be cultivated without danger to the trees, the machine being so arranged that the draft animals or the tractor are driven down the space between the rows of trees, while the beam 14, with its ground treating devices reach under the low hanging branches of the trees to a point within a few inches of the trunks. The cultivator is especially adapted for use with citrous bearing fruit trees in which the branches hang low and which are damaged by the parts of the cultivators generally used, or by the animals or tractor used to draw the cultivator. Thus the soil can be cultivated close up to the trunks of the trees without danger of injury to the trunks or the low hanging branches and limbs.

Rotatably disposed vertically through the forward end of the draft beam 10 is the pintle of the caster wheel, which supports the forward end of the cultivator.

What is claimed is:

An orchard cultivator consisting of a triangular frame including three beams, one of the beams being disposed in the line of draft of the cultivator, another of the beams being pivotally connected to the forward end of the first beam and the remaining beam being pivotally connected to the second beam and adjustably connected to the rear of the first beam, ground treating devices on the second beam, casters on the first and second beams, buffer wheels carried by the rear portion of the second beam, and a manually operable steering ground engaging disk mounted on the rear end of the first beam.

In testimony whereof we affix our signatures in the presence of two witnesses.

FRANK F. PRATT.
FRANK H. FARMER.
JAMES KEMP.

Witnesses for Frank F. Pratt and Frank H. Farmer:
H. A. GAMBLE,
J. MEEHAN.

Witness for James Kemp:
ORIS J. REESE.

Copies of this patent may be obtained for five cents each, by addressing the "Commissioner of Patents Washington, D. C."